Jan. 13, 1931.  J. MATUSHAK  1,788,774
CHILD'S VEHICLE
Filed June 18, 1929
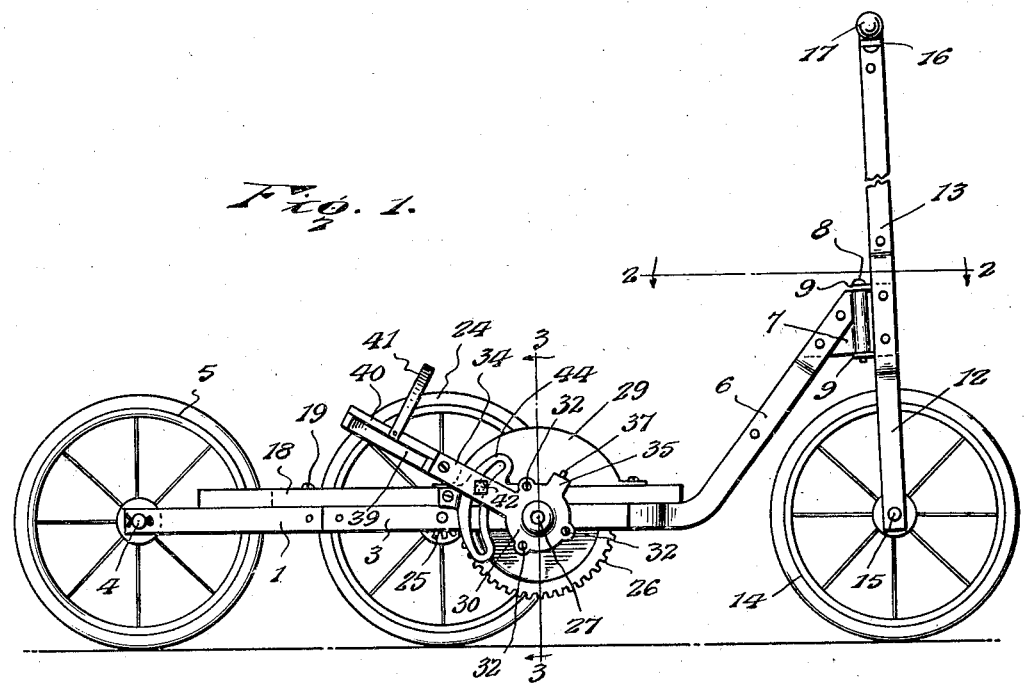
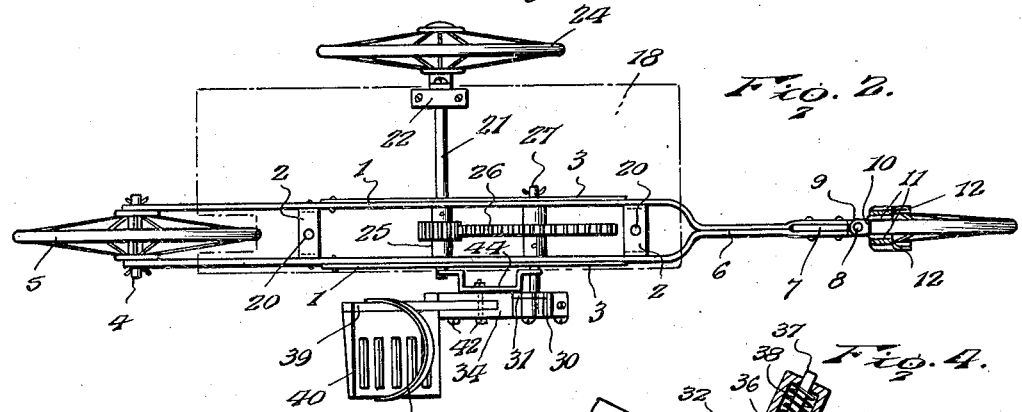
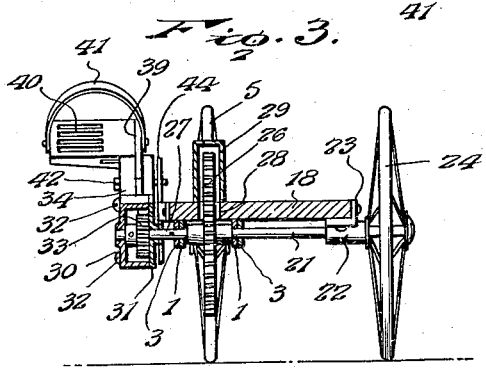
Inventor
J. Matushak.
By Lacey & Lacey Attorneys Patented Jan. 13, 1931

1,788,774

UNITED STATES PATENT OFFICE

JOSEPH MATUSHAK, OF GARFIELD, NEW JERSEY

CHILD'S VEHICLE

Application filed June 18, 1929. Serial No. 371,796.

This invention relates to vehicles and more particularly to a child's vehicle of the type known as a "scooter."

When a vehicle of the type constituting the subject-matter of this invention is propelled by standing upon the platform of the vehicle and pushing upon the ground with one foot, the vehicle cannot be rapidly propelled and in addition this practice will often cause one shoe to become worn out quicker than the other.

Therefore, one object of the invention is to provide a child's vehicle which may be propelled forwardly by means of mechanism including a pedal.

It has also been found that it is sometimes difficult for a small child to operate a vehicle of this type which is provided with only two wheels one at each end as the child will have difficulty in balancing and may be injured by the vehicle falling over.

Therefore, another object of the invention is to provide a vehicle of this character in which propelling means for the vehicle is not only operated by means of a pedal but includes a ground-engaging wheel disposed intermediate the length of the vehicle and at one side thereof so that the vehicle has a three-point contact with the ground and will remain in an upright position without depending upon motion to keep it upright.

Another object of the invention is to so construct the actuating means that by a relatively slow movement of the pedal the drive wheel may be caused to rotate very rapidly and move the vehicle forwardly at a fast rate of speed.

The invention is illustrated in the accompanying drawing, wherein

Figure 1 is a view showing the improved vehicle in side elevation,

Fig. 2 is a view taken on the line 2—2 of Fig. 1 with the platform removed in order to disclose the construction of operating means beneath the platform, Fig. 3 is a transverse sectional view through the vehicle taken on the line 3—3 of Fig. 1, and Fig. 4 is a fragmentary sectional view of a portion of the operating means.

The frame of this vehicle is provided with side bars 1 which are spaced from each other, as shown in Fig. 2, by bridge pieces or brackets 2 and between the brackets are reinforced by strips 3 riveted or otherwise firmly secured against their outer side faces. The rear end portions of the side bars 1 are perforated to receive the axle 4 of the rear wheel 5 and the forward portions of the bars are bent toward each other and riveted together to form a shank 6 which extends upwardly, as shown in Fig. 1 and is of double thickness so that it will be very strong. A bearing bracket 7 is riveted between the strips or bars at the upper end of the shank and through this bearing bracket extends a bolt or pin 8 which also extends through the rearwardly projecting ears 9 of a bracket 10, the forwardly extending arms 11 of which are riveted against the inner faces of strips from which the front forks 12 and steering posts 13 are formed. The guiding wheel 14 at the front of the vehicle is rotatably mounted between the forks 12 upon an axle 15 received in openings formed in the lower ends of the strips from which the forks are formed and the upper ends of these strips are bent outwardly to form a head 16 upon which a handle bar 17 is secured. It will thus be seen that a child standing upon the platform 18 which is secured by bolts 19 passed through openings 20 in the brackets or bridges 2 may easily grasp the handle bar and by turning the front wheel guide the vehicle.

In order to propel the vehicle, there has been provided propelling means including a shaft 21 journaled in openings formed in the frame of the vehicle and also rotatably mounted in a bearing 22 secured against the under face of the platform at the opposite side of the platform from the frame and having an ear 23 secured against a side edge face of the platform, as shown in Fig. 3. A drive wheel 24 is fixed upon the outer end of the shaft 21 and upon its inner end portion between the side bars of the frame is fixed a small gear 25 which meshes with a large gear 26 fixed upon a shaft 27 which shaft is journaled through the side bars of the frame in advance of the shaft 21 and projects outwardly at the other side of the platform from the wheel 24. A slot 28 is formed in the platform to receive the upper portion of the gear 26 and this protruding upper portion of the gear is shielded by a hood 29 secured against the upper face of the platform. It will be readily seen that when the shaft 27 is rotated the shaft 21 will be caused to rotate at a great deal faster rate of speed and, therefore, the vehicle may be propelled forwardly at a high rate of speed.

A housing 30 fits loosely about the shaft 27 and is closed at its inner side by a plate 31 to which the housing is removably secured by bolts or machine screws 32. Center bearings are formed in the closure plate and wall of the housing to snugly receive the shaft and within the housing is disposed a ratchet 33 fixed upon the shaft. It will, therefore, be seen that the housing may be rotated about the shaft when the arm 34 of the housing is swung vertically. An extension 35 projects from the housing, as shown in Fig. 4, and constitutes a socket to receive a pawl 36, the stem 37 of which projects upwardly through the top of the socket and about this stem is disposed a coiled spring 38 which urges the pawl downwardly so that it engages the teeth of the ratchet. By this arrangement the housing may be turned about the shaft and its ratchet when the arm 34 is swung upwardly but when the arm is swung downwardly the pawl will have firm engagement with the teeth of the ratchet and cause the ratchet and the shaft 27 to rotate and thereby impart movement to the shaft 21. The free end portion of the arm is split longitudinally to receive a pedal bar 39 carrying a pedal 40 to which a stirrup 41 is applied and this pedal bar is firmly secured in the slot of the arm 34 by bolts 42, one of which extends through a slot formed in a guide bracket 44 screwed or otherwise firmly secured against the adjacent side edge face of the platform. By this arrangement swinging movement of the pedal and arm 34 will be controlled.

When the vehicle is in use, the operator stands upon the platform with one foot passed through the stirrup 41 and resting upon the pedal. By pressing downwardly upon the pedal the arm 34 will be forced downwardly and as the housing 30 turns rotary motion will be imparted to the shaft 27 and through the medium of the gears 26 and 25 rotary motion will be transmitted from the shaft 27 to the shaft 21. This will cause the shaft 21 to rotate very rapidly and the vehicle will be propelled forwardly at a high rate of speed. When the foot is moved upwardly, it catches against the stirrup so that the pedal and the arm 34 will be drawn upwardly with the housing turning about the shaft and ratchet and downward pressure can then be again exerted in order to impart rotary motion to the two shafts. By this arrangement a child standing upon the platform can very easily propel the vehicle forwardly at a high rate of speed and there will be no danger of the vehicle turning over as it is supported upon three wheels instead of two and the intermediate wheel is spaced quite a distance to one side of the front and rear wheels.

Having thus described the invention, I claim:

1. A vehicle comprising a frame, wheels at the front and back of said frame and one constituting a steering wheel, a shaft rotatably mounted intermediate the length of said frame and projecting from one side thereof, a wheel carried by the outer end portion of said shaft and constituting a propelling wheel, a drive shaft rotatably carried by said frame transversely thereof and projecting from the frame at the other side thereof from said propelling wheel, means for transmitting rotary motion from said drive shaft to the first shaft, and means upon the outer portion of said drive shaft for imparting rotary motion thereto.

2. A vehicle comprising a frame, a shaft rotatably mounted intermediate the length of said frame, a wheel carried by said shaft and constituting a propelling wheel, a drive shaft rotatably carried by said frame transversely thereof and projecting from one side of the frame, means for transmitting rotary motion from said drive shaft to the first shaft, a ratchet fixed upon the outer end of said drive shaft, a housing loose upon said drive shaft about said ratchet, a pawl carried by said housing and yieldably held in engagement with said ratchet, and means to alternately rotate said housing in opposite directions and impart rotation to the drive shaft.

3. A vehicle comprising a frame, a shaft rotatably mounted intermediate the length of said frame, a wheel carried by said shaft and constituting a propelling wheel, a drive shaft rotatably carried by said frame transversely thereof and projecting from one side of the frame, means for transmitting rotary motion from said drive shaft to the first shaft, a ratchet fixed upon the outer end of said drive shaft, a housing loose upon said drive shaft about said ratchet, a pawl carried by said housing and yieldably held in engagement with said ratchet, an arm extending radially from said housing, a pedal bar extending longitudinally from said arm, a pedal carried by said bar, and a stirrup carried by said pedal and adapted to engage over a person's foot to retain the foot upon the pedal and cause the pedal to move upwardly when the foot is raised.

4. A vehicle comprising a frame, a shaft rotatably mounted intermediate the length of said frame, a wheel carried by said shaft and constituting a propelling wheel, a drive shaft rotatably carried by said frame transversely thereof and projecting from one side of the frame, means for transmitting rotary motion from said drive shaft to the first shaft, a ratchet fixed upon the outer end of said drive shaft, a housing loose upon said drive shaft about said ratchet, a pawl carried by said housing and yieldably held in engagement with said ratchet, an arm extending radially from said housing, a pedal bar extending longitudinally from said arm, a pedal carried by said bar, a bracket having a portion extending vertically at one side of said bar and formed with an arcuate slot, and a pin carried by said bar and engaged in said slot to guide and limit movement of the bar.

5. A vehicle comprising a frame, wheels at the front and back of said frame and one constituting a steering wheel, a shaft rotatably mounted intermediate the length of said frame and projecting from one side thereof, a wheel carried by the outer end portion of said shaft and constituting a propelling wheel, a drive shaft rotatably carried by said frame transversely thereof and projecting from the frame at the other side thereof from said propelling wheel, means for transmitting rotary motion from said drive shaft to the first shaft, a ratchet fixed upon the outer end of said drive shaft, a housing loose upon said drive shaft about said ratchet, a pawl carried by said housing and yieldably held in engagement with said ratchet, an arm extending radially from said housing, a pedal bar extending longitudinally from said arm, a pedal carried by said bar, a platform secured upon said frame and projecting transversely therefrom at the side from which the first shaft projects, a bearing for the shaft carried by said platform adjacent its outer side edge, a bracket secured against the inner side edge of said platform and having a portion extending vertically between the platform and pedal bar and formed with a vertically extending arcuate slot, and a pin carried by said bar and engaged in said slot to guide and limit movement of the bar.

6. A vehicle comprising a frame consisting of strips extending in transversely spaced relation to each other and being bent to extend towards each other at the front of the frame and upwardly to form a shank, bridges extending between the spaced portions of said strips and secured thereto near the front and rear ends of the frame, a rear wheel rotatably mounted between the rear ends of said strips, front forks having an upstanding post pivotally connected with the upper end of said shank, a handle bar carried by said post, a wheel rotatably carried by said forks, a platform resting upon said frame and secured to said bridges and projecting from one side of the frame, a driven shaft rotatably carried by said strips and extending therefrom beneath said platform and beyond the outer side edge thereof, a wheel fixed upon the outer end of said driven shaft, a drive shaft rotatably carried by said strips in front of said driven shaft, meshing gears fixed upon said shafts between said strips with the gear of the drive shaft extending upwardly through a slot in the platform, and means for imparting rotary motion to said drive shaft.

In testimony whereof I affix my signature.

JOSEPH MATUSHAK. [L. S.]